(12) United States Patent
Noh et al.

(10) Patent No.: US 10,971,739 B2
(45) Date of Patent: Apr. 6, 2021

(54) COMMON FLOW FIELD TYPE FUEL CELL SEPARATOR, FUEL CELL SEPARATOR ASSEMBLY, AND FUEL CELL STACK

(71) Applicants: SEJONG IND. CO., LTD., Ulsan (KR); Korea Automotive Technology Institute, Chungcheongnam-do (KR)

(72) Inventors: Hyung-Chul Noh, Yongin-si (KR); Ho-Cheol Suh, Yongin-si (KR); Young-Mo Goo, Chungcheongnam-do (KR); Myong-Hwan Kim, Chungcheongnam-do (KR)

(73) Assignees: Sejong IND. CO., LTD, Ulsan (KR); Korea Automotive Technology Institute, Chungcheongnam-do (KR)

( * ) Notice: Subject to any disclaimer, the term of this patent is extended or adjusted under 35 U.S.C. 154(b) by 307 days.

(21) Appl. No.: 15/934,676

(22) Filed: Mar. 23, 2018

(65) Prior Publication Data
US 2018/0277861 A1  Sep. 27, 2018

(30) Foreign Application Priority Data

Mar. 24, 2017 (KR) .......................... 10-2017-0037766
Mar. 24, 2017 (KR) .......................... 10-2017-0037767

(51) Int. Cl.
| | |
|---|---|
| *H01M 8/04089* | (2016.01) |
| *H01M 8/2483* | (2016.01) |
| *H01M 8/0258* | (2016.01) |
| *H01M 8/0206* | (2016.01) |
| *H01M 8/1004* | (2016.01) |
| *H01M 8/0254* | (2016.01) |
| *H01M 8/0228* | (2016.01) |
| *H01M 8/0267* | (2016.01) |
| *H01M 8/0273* | (2016.01) |

(52) U.S. Cl.
CPC ..... *H01M 8/04089* (2013.01); *H01M 8/0206* (2013.01); *H01M 8/0228* (2013.01); *H01M 8/0254* (2013.01); *H01M 8/0258* (2013.01); *H01M 8/0267* (2013.01); *H01M 8/0273* (2013.01); *H01M 8/1004* (2013.01); *H01M 8/2483* (2016.02); *Y02P 70/50* (2015.11)

(58) Field of Classification Search
None
See application file for complete search history.

(56) References Cited

U.S. PATENT DOCUMENTS

2011/0033781 A1* 2/2011 Chin .................. H01M 8/0267
429/510

FOREIGN PATENT DOCUMENTS

| KR | 10-1134429 B1 | 4/2012 |
| KR | 10-1180791 B1 | 9/2012 |
| KR | 101491349 B1 | 2/2015 |
| KR | 10-2016-0096175 A | 8/2016 |
| KR | 20170026771 A | 3/2017 |

* cited by examiner

*Primary Examiner* — Daniel S Gatewood
(74) *Attorney, Agent, or Firm* — TraskBritt (57) ABSTRACT

Disclosed herein are a common flow field type fuel cell separator, a fuel cell separator assembly, and a fuel cell stack, including a flow field connected to a manifold in which an inlet and an outlet for each of hydrogen, air, and cooling water are formed, and configured such that flows of the hydrogen, the air, and the cooling water are free from interfering with each other.

5 Claims, 9 Drawing Sheets

COMMON FLOW FIELD TYPE FUEL CELL SEPARATOR, FUEL CELL SEPARATOR ASSEMBLY, AND FUEL CELL STACK

CROSS-REFERENCE TO RELATED APPLICATION(S)

This application claims the benefit of Korean Patent Application No. KR 10-2017-0037766, filed Mar. 24, 2017, and KR 10-2017-0037767, also filed Mar. 24, 2017, the disclosure of each of which is hereby incorporated herein in its entirety by this reference.

TECHNICAL FIELD

The present disclosure relates generally to a common flow field type fuel cell separator, a fuel cell separator assembly, and a fuel cell stack and, more particularly, to a fuel cell separator to which a common flow field is applied, and a fuel cell stack that includes a double gasket type fuel cell separator assembly, whereby performance of the flow field is not degraded even under a depressed state due to stacking.

BACKGROUND

Generally, a fuel cell stack is mounted in a fuel cell vehicle, and the fuel cell stack generates power for the vehicle by generating electricity and water due to electrochemical reaction of hydrogen and oxygen.

To this end, the fuel cell stack has, as a main component, a unit cell composed of a membrane-electrode assembly, a gas diffusion layer, and a separator.

Specifically, the membrane-electrode assembly is located at the very center of the fuel cell stack and has a catalyst layer coated on both sides of a polymer electrolyte membrane. The gas diffusion layer is located outside the membrane-electrode assembly. The separator is stacked on an outer portion of the gas diffusion layer and enables formation of a double flow field of a gas channel for air electrode/hydrogen electrode and a water channel for cooling water so as to provide an air electrode/hydrogen electrode separator and a cooling water separator, thereby supplying fuel and discharging water generated by the reaction. The gasket is joined to the separator so as to be positioned between the separator and the gas diffusion layer. The unit cell is comprised of one membrane-electrode assembly, two gas diffusion layers, and two separators, and several tens to hundreds of unit cells are stacked so that the fuel cell stack can provide an output of a desired scale.

Particularly, the gasket enables maintaining of airtightness with respect to the separator by causing several tens to hundreds of unit cells to be depressed while being stacked, thereby preventing leakage of hydrogen, air and cooling water that flow through the flow field of the separator.

The separator is comprised of a separator for air electrode/hydrogen electrode and a separator for supplying cooling water, by which a double flow field of a gas channel for the air electrode/hydrogen electrode and a water channel for cooling water is formed to provide fuel and discharge water generated by the reaction.

BRIEF SUMMARY

The separator is divided into an air electrode/hydrogen electrode separator and a cooling water separator for the gas/water channel, thereby increasing mold design complexity and quantity of molds required.

For example, in order to develop a fuel cell stack of certain specifications, a total of two or more sets of separator molds with one set of air electrode/hydrogen electrode separators and one set of cooling water separators are required to be developed, thereby increasing the number of separator molds and increasing the cost.

Accordingly, the present disclosure addresses the above problems occurring in the prior art. An object of this disclosure is to provide a common flow field type fuel cell separator and a fuel cell separator assembly, by which the flow field is designed in a mold and shape common for a single separator and the metal separator is fabricated from one set of metal molds of the same shape using the common flow field. By adopting a structure that causes gas and cooling water supplied from the manifold to flow through the flow field without interfering with each other through the flow field, the cost is reduced compared with a double flow field.

In addition, since the gasket is compressed by depression due to the separator and the membrane-electrode assembly in the unit cell stacking process, through which several tens to hundreds of unit cells are stacked, and by depression due to coupling of the separator and the gas diffusion layer after the cells are stacked, the flow field inevitably becomes narrower.

As a result, since the flow field of the separator is narrowed, airtightness may be secured, but flow performance of hydrogen and air, and cooling water is degraded.

In general, the reduction of the flow field due to excessive depression of the gasket can be solved by placing a separate support member between the separator and the gas diffusion layer. However, such method must be configured such that the support member is inserted to cause a support line to pass over the gas diffusion layer, whereby the flow field becomes complicated, which inevitably leads to a pressure loss in the flow field.

Therefore, it is required to manufacture the separator in such a manner as to avoid narrowing of the flow field or reduction in pressure.

Accordingly, the present invention has been made keeping in mind the above problems occurring in the prior art. An object of the present disclosure is to provide a double gasket type fuel cell separator assembly capable of preventing the pressure loss in the flow field due to complication of the flow path by providing a double gasket that avoids narrowing the flow field and maintains airtightness of the flow field without applying a separate support member, even when unit cells are stacked and depressed after stacking.

In order to accomplish the above object, a fuel cell separator according to the present disclosure comprises a common flow field type fuel cell separator including a flow field that is connected to a manifold in which an inlet and an outlet for each of hydrogen, air, and cooling water are formed, causing flows of the hydrogen, the air, and the cooling water not to interfere with each other.

As a preferred embodiment, the flow field is divided into three channels: a hydrogen channel connecting the inlet and the outlet for the hydrogen to cause a flow of the hydrogen to be formed; an air channel connecting the inlet and the outlet for the air to cause a flow of the air to be formed; and a cooling water channel connecting the inlet and the outlet for the cooling water to cause a flow of the cooling water to be formed. The hydrogen channel, the air channel, and the cooling water channel are not connected with one other.

As a preferred embodiment, the inlet of the hydrogen and the outlet of the air are located together with the inlet of the cooling water that divides the outlet of the hydrogen and the inlet of the air upward and downward. The outlet of the hydrogen and the inlet of the air are located with the outlet of the cooling water that divides the inlet of the hydrogen and the outlet of the air upward and downward. The manifold is divided into a left manifold in which the outlet of the hydrogen, the inlet of the air, and the outlet of the cooling water are located, and a right manifold in which the inlet of the hydrogen, the outlet of the air, and the inlet of the cooling water are located. Each of the hydrogen channel, the air channel and the cooling water channel is connected between the left manifold and the right manifold.

As a preferred embodiment, the outlet of the hydrogen is connected to one side of the hydrogen channel upward of the outlet of the cooling water, whereas the inlet of the hydrogen is connected to the other side of the hydrogen channel downward of the inlet of the cooling water, and the outlet of the air is connected to one side of the air channel upward of the inlet of the cooling water, whereas the inlet of the air is connected to the other side of the air channel downward of the outlet of the cooling water. The inlet of the cooling water and the outlet of the cooling water are in the same position and are connected to the cooling water channel.

As a preferred embodiment, the inlet of the hydrogen includes a hydrogen return passage portion into which the hydrogen flows and a hydrogen return route portion through which the hydrogen discharged out of the hydrogen channel passes into the manifold, and the outlet of the hydrogen includes a hydrogen discharge passage portion from which the hydrogen flows out and a hydrogen discharge route portion through which the hydrogen entering into the hydrogen channel flows into the manifold.

As a preferred embodiment, each of the hydrogen discharge route portion and the hydrogen return route portion is includes front and rear slits that are separated from each other, wherein the front slit causes the hydrogen to flow into the manifold, whereas the rear slit causes the hydrogen to flow out of the manifold. The inlet of the air includes an air return passage portion into which the air flows and an air return route portion through which the air discharged out of the air channel passes into the manifold, and the outlet of the air includes an air discharge passage portion from which the air flows out and an air discharge route portion through which the air entering into the air channel flows into the manifold.

As a preferred embodiment, each of the air discharge route portion and the air return route portion includes front and rear slits that are separated from each other, in which the front slit causes the air to flow into the manifold, whereas the rear slit causes the air to flow out of the manifold.

As a preferred embodiment, the inlet of the cooling water includes a cooling water return passage portion into which the cooling water flows and a cooling water route portion through which the cooling water discharged out of the cooling water channel passes into the manifold, and the outlet of the cooling water includes a cooling water discharge passage portion from which the cooling water flows out and a cooling water discharge route portion through which the cooling water entering into the cooling water channel flows into the manifold.

As a preferred embodiment, the manifold and the flow field are surrounded by gasket flanges.

In addition, in order to accomplish the above, a fuel cell separator according to this disclosure comprises: a left manifold that forms a flow in which the hydrogen is discharged out of the hydrogen discharge passage portion and the hydrogen discharge route portion and a flow in which the air enters into the air return passage portion and the air return route portion, and a flow in which the cooling water is discharged out of the cooling water discharge passage portion and the cooling water route portion; a right manifold that forms a flow in which the hydrogen enters into the hydrogen return passage portion and the hydrogen return route portion, a flow in which the air is discharged out of the air discharge passage portion and the air discharge route portion, and a flow in which the cooling water enters into the cooling water return passage portion and the cooling water route portion; a flow field positioned between the left manifold and the right manifold to connect the left manifold to the right manifold and configured such that each flow of the hydrogen, the air, and the cooling water are free from interfering with each other; and a gasket flange forming an edge by surrounding the left manifold, the flow field, and the right manifold.

As a preferred embodiment, the cooling water discharge passage portion and the cooling water route portion divides the hydrogen discharge passage portion and the hydrogen discharge route portion, and the air return passage unit and the air return route portion upward and downward, and the cooling water return passage portion and the cooling water route portion divide the hydrogen return passage portion and the hydrogen return route portion, and the air discharge passage unit and the air discharge route portion upward and downward.

As a preferred embodiment, the hydrogen discharge passage portion and the hydrogen discharge route portion are connected to the hydrogen channel that connects the hydrogen return passage portion to the hydrogen return route portion; the air discharge passage portion and the air discharge route portion are connected to the air channel that connects the air return passage portion to the air return route portion; and the cooling discharge passage portion and the cooling water route portion are connected to the cooling water channel that connects the cooling water return passage portion to the cooling water route portion, wherein the hydrogen channel, the air channel, and the cooling water channel form the flow field while not being connected to each other.

As a preferred embodiment, each of the hydrogen discharge route portion and the hydrogen return route portion, and the air discharge route portion and the air return route portion includes front and rear slits that are separated from each other, wherein the hydrogen enters into the front slit and the hydrogen is discharged out of the rear slit.

In addition, in order to accomplish the above object, the fuel cell stack according to this disclosure comprises a fuel cell separator provided with a flow field located between a left manifold and a right manifold, wherein an inlet and an outlet for each of hydrogen, air, and cooling water are formed and configured such that a flow of the hydrogen from the left manifold to the right manifold, a flow of the air from the right manifold to the left manifold, and a flow of the cooling water from the left manifold to the right manifold are free from interfering with each other; and a unit cell to which the fuel cell separator is applied along with a membrane-electrode assembly and a gas diffusion layer to generate output.

In addition, in order to accomplish the above object, a fuel cell separator assembly according to the present disclosure comprises a sub-gasket surrounding a periphery of a flow path of hydrogen, air, and cooling water formed in the fuel cell separator to allow a sealing portion to be formed, and a main gasket in order to cause the flow path to be divided into a hydrogen flow path, an air flow path, and a cooling water flow path, surrounding each of the hydrogen flow path, the air flow path, and the cooling water flow path to allow an edge to be formed.

As a preferred embodiment, the sub-gasket is made of a rubber or silicon material and added to an entire edge of the fuel cell separator with the same width as that of the edge of the fuel cell separator to surround the main gasket.

As a preferred embodiment, the main gasket is provided such that an edge of the flow path is formed by a left manifold line and a right manifold line formed in opposite sides with respect to a center section and a loop is formed using an edge line connecting the left manifold line to the right manifold line, wherein each of the left manifold line and the right manifold line is connected to the edge line at a location inside the edge line using an inner connection line.

As a preferred embodiment, the main gasket is provided such that an edge of the flow path is formed by a left manifold line and a right manifold line formed in opposite sides with respect to a center section, an inner loop is formed using an edge line connecting the left manifold line to the right manifold line, and an outer loop is formed using a sub-edge line surrounding the edge line, wherein the edge line is connected to the sub-edge line using the outer connection line.

In addition, in order to accomplish the above object, a fuel cell separator assembly according to the present disclosure comprises: a fuel cell separator forming flow paths of hydrogen, air, and cooling water and having one surface as a reaction surface and the other surface as a cooling surface; a reaction surface gasket located in the reaction surface and including a reaction surface main gasket maintaining airtightness with respect to the flow path via an edge surrounding the flow path and a reaction surface sub-gasket maintaining airtightness with respect to the reaction surface by surrounding the reaction surface main gasket; a cooling surface gasket located in the cooling surface and including a cooling surface main gasket maintaining airtightness with respect to the flow path via an edge surrounding the flow path and a cooling surface sub-gasket maintaining airtightness with respect to the cooling surface by surrounding the cooling surface main gasket.

As a preferred embodiment, the reaction surface sub-gasket and the cooling surface sub-gasket are made of a rubber or silicon material, and are formed in the same width to that of the fuel cell separator.

As a preferred embodiment, the reaction surface main gasket is provided such that an edge of the flow path is formed by a left manifold line and a right manifold line formed in opposite sides with respect to a center section and a loop is formed using an edge line connecting the left manifold line to the right manifold line, wherein each of the left manifold line and the right manifold is connected to the edge line inside the edge line using an inner connection line formed in a "T" shape.

As a preferred embodiment, the cooling surface main gasket is provided such that an edge of the flow path is formed by a left manifold line and a right manifold line formed in opposite sides with respect to a center section, an inner loop is formed using an edge line connecting the left manifold line to the right manifold line, and an outer loop is formed using a sub-edge line surrounding the edge line, in which an outer connection line formed in a "-" shape is further provided, and the outer connection line connects the edge line to the sub-edge line.

As a preferred embodiment, a fuel cell separator according to this disclosure comprises: a left manifold that forms a flow in which the hydrogen is discharged out of the hydrogen discharge passage portion and the hydrogen discharge route portion and a flow in which the air enters into the air return passage portion and the air return route portion, and a flow in which the cooling water is discharged out of the cooling water discharge passage portion and the cooling water discharge route portion; a right manifold that forms a flow in which the hydrogen enters into the hydrogen return passage portion and the hydrogen return route portion, a flow in which the air is discharged out of the air discharge passage portion and the air discharge route portion, and a flow in which the cooling water enters into the cooling water return passage portion and the cooling water route portion; a flow field positioned between the left manifold and the right manifold to connect the left manifold to the right manifold and configured such that each flow of the hydrogen, the air, and the cooling water are free from interfering with each other; and a gasket flange forming an edge by surrounding the left manifold, the flow field, and the right manifold.

Although it is necessary to separately prepare the separator for air electrode/hydrogen electrode and the separator for cooling water and thus develop a total of two or more sets of separator molds with one set of separator molds for air electrode/hydrogen electrode and one set of separator molds for cooling water in order to develop a fuel cell stack of one specification, the disclosure may allow the separator to be manufactured with only one set of molds without separate molds via design improvements of the manifold achieved by applying one set of the same molds symmetrically.

In addition, the present disclosure may be applied to the metal separator of the fuel cell separator, thereby greatly reducing the cost of manufacturing the metal separator.

In addition, the fuel cell stack, according to this disclosure, may be manufactured as a metal separator with a manufacturing cost greatly reduced, thereby achieving a competitiveness advantage.

In addition, the fuel cell separator, according to this disclosure, provides a double airtightness structure by adding a sub-gasket together with a gasket, whereby there is an advantage that the flow field is not narrowed even when several tens to hundreds of unit cells are stacked.

In addition, the fuel cell separator according to the present disclosure has the sub-gasket located at the outermost part of the separator, thereby solving complication of the flow path, which may cause a pressure loss of the flow field when applying a separate support member.

In addition, the fuel cell separator according to this disclosure may compensate for a flatness of the separator (warping caused by springback) due to manufacturing of separators of a large area as sealing material of rubber or silicone is applied to the sub-gasket, in a process of stacking the cells.

In addition, the fuel cell stack according to the disclosure may be manufactured with a metal separator or a carbon composite separator of a double airtightness structure, thereby maintaining airtightness and flow field performance.

BRIEF DESCRIPTION OF THE DRAWINGS

The above and other objects, features and advantages of this disclosure will be more clearly understood from the following detailed description taken in conjunction with the accompanying drawings, in which.

DETAILED DESCRIPTION

Embodiments of present invention will be described in detail below with reference to the accompanying drawings. Repeated descriptions and descriptions of known functions and configurations that have been deemed to make the gist of the present disclosure unnecessarily obscure will be omitted below. The embodiments of the present invention are intended to fully describe the present invention to a person having ordinary knowledge in the art to which the present disclosure pertains. Accordingly, the shapes, sizes, etc., of components in the drawings may be exaggerated to make the description clearer.

Hereinafter, exemplary embodiments of this disclosure will be described in detail with reference to the accompanying drawings, and such embodiments may be embodied in many different forms by a person having ordinary knowledge in the art to which the present invention pertains, and therefore the present invention is not limited to the embodiment described herein.

Figure 1:
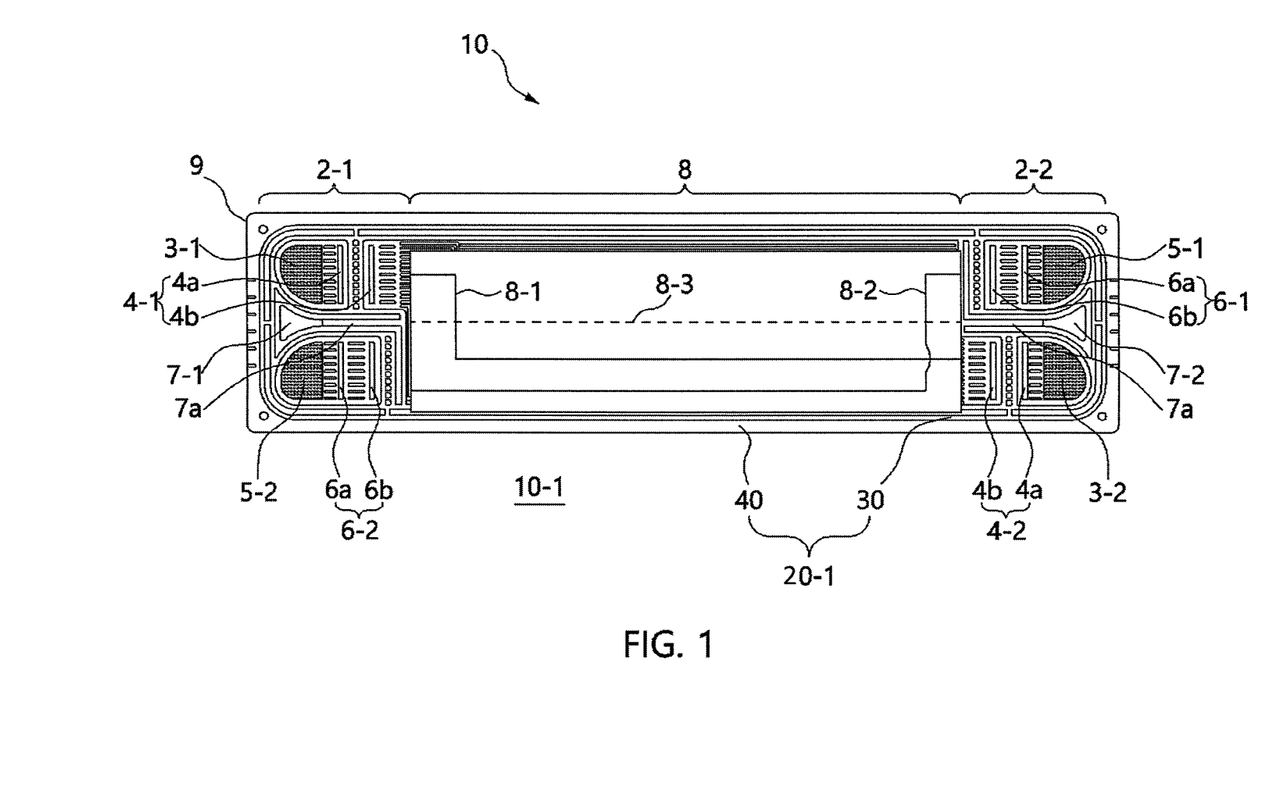
FIG. 1 illustrates a configuration diagram of a common flow field type fuel cell separator according to a first embodiment of the present disclosure.

Referring to FIG. 1, a fuel cell separator 10 is configured such that a left manifold 2-1 and a right manifold 2-2 of a predetermined shape are respectively formed at left and right sides thereof; a flow field 8 is formed to lead to the left and right manifolds 2-1 and 2-2 at a middle portion of the fuel cell separator 10; and an edge is formed by a gasket flange 9 surrounding the left and right manifolds 2-1 and 2-2 and the flow field 8.

In particular, each of the left and right manifolds 2-1 and 2-2 has the same shape, and the flow field 8 is connected from the left manifold 2-1 to the right manifold 2-2 or the right manifold 2-2 to the left manifold 2-1 so that flows of hydrogen, air, and cooling water do not interfere with each other. As a result, the fuel cell separator 10 is formed as a common flow field type using the left and right manifolds 2-1 and 2-2, thereby greatly reducing costs that are necessary for designing the molds and manufacturing the separator.

Specifically, the left manifold 2-1 includes a hydrogen discharge passage portion 3-1, a hydrogen discharge route portion 4-1, an air return passage portion 5-2, an air return route portion 6-2, a cooling water discharge passage portion 7-1, and a cooling water route portion 7a. Herein, "discharge" means an outlet to escape, and "return" means an inlet to enter again.

As an example, the hydrogen discharge passage portion 3-1 and the hydrogen discharge route portion 4-1 are formed by making a hole in the surface of the body of the left manifold 2-1, in which the hydrogen discharge route portion 4-1 includes front and rear slits 4a and 4b that are located a distance from each other. The front and rear slits 4a and 4b located a distance from the hydrogen discharge passage portions 3-1 are located close to the flow field 8, because the hydrogen discharge passage portion 3-1 and the hydrogen discharge route portion 4-1 are arranged in a straight line in terms of layout. Particularly, the hydrogen discharge passage portion 3-1 is approximately formed in a "U" shape in which a portion facing toward the cooling water discharge passage portion 7-1 is cut away, whereas each of the front and rear slits 4a and 4b is formed as a straight-shaped slit.

As an example, the air return passage portion 5-2 and the air return route portion 6-2 are formed by making a hole in the surface of the body of the left manifold 2-1 in which the air return route portion 6-2 includes front and rear slits 6a and 6b that are located a distance from each other. The front and rear slits 6a and 6b are located a distance from the air return passage portion 5-2 and are located close to the flow field 8, because the air return passage portion 5-2 and the air return route portion 6-2 are arranged in a straight line in terms of layout. Particularly, the air return passage portion 5-2 is approximately formed in a "U" shape in which a portion facing toward the cooling water discharge passage portion 7-1 is cut away, whereas each of the front and rear slits 6a and 6b is formed as a straight slit.

For example, the cooling water discharge passage portion 7-1 separates the hydrogen discharge passage portion 3-1 from the air return passage portion 5-2, and the cooling water route portion 7a separates the hydrogen discharge route portion 4-1 from the air return route portion 6-2. Particularly, the cooling water discharge passage portion 7-1 is formed by making a hole in the surface of the body of the left manifold 2-1, whereas the cooling water route portion 7a is formed with a groove in the surface of the body of the left manifold 2-1.

Accordingly, the left manifold 2-1 is approximately formed in an "s" shape because the hydrogen discharge passage portion 3-1 and the air return passage portion 5-2 are symmetrical with respect to the cooling water discharge passage portion 7-1 therebetween.

Specifically, the right manifold 2-2 includes a hydrogen return passage portion 3-2, a hydrogen return route portion 4-2, an air discharge passage portion 5-1, an air discharge route portion 6-1, a cooling water return passage portion 7-2, and the cooling water route portion 7a. Herein, "discharge" means an outlet to escape, and "return" means an inlet to enter again.

As an example, the hydrogen return passage portion 3-2 and the hydrogen return route portion 4-2 are formed by making a hole in the surface of the body of the right manifold 2-2, in which the hydrogen return route portion 4-2 includes front and rear slits 4a and 4b that are located a distance from each other. The front and rear slits 4a and 4b are located a distance from the hydrogen return passage portion 3-2 and are located close to the flow field 8, because the hydrogen return passage portion 3-2 and the hydrogen return route portion 4-2 are arranged in a straight line in terms of layout. Particularly, the hydrogen return passage portion 3-2 is approximately formed in a "U" shape in which a portion toward the cooling water return passage portion 7-2 is cut away, whereas each of the front and rear slits 4*a* and 4*b* is formed as a straight-shaped slit.

As an example, the air discharge passage portion 5-1 and the air discharge route portion 6-1 are formed by making a hole in the surface of the body of the right manifold 2-2, in which the air discharge route portion 6-1 includes the front and rear slits 6*a* and 6*b* that are located a distance from each other. The front and rear slits 6*a* and 6*b* located a distance from the air discharge passage portion 5-1 are located closely to the flow field 8, because the air discharge passage portion 5-1 and the air discharge route portion 6-1 are arranged in a straight line in terms of layout. Particularly, the air discharge passage portion 5-1 is approximately formed in a "U" shape in which a portion toward the cooling water return passage portion 7-2 is cut away, whereas each of the front and rear slits 6*a* and 6*b* is formed as a straight slit.

As an example, the cooling water return passage portion 7-2 separates the hydrogen return passage portion 3-2 from the air discharge passage portion 5-1, and the cooling water route portion 7*a* separates the hydrogen return route portion 4-2 from the air discharge route portion 6-1. Particularly, the cooling water return passage portion 7-2 is formed by making a hole in the surface of the body of the right manifold 2-2, whereas the cooling water route portion 7*a* is formed with a groove in the surface of the body of the right manifold 2-2. Herein, "discharge" means an outlet to escape, and "return" means an inlet to enter again.

Accordingly, the right manifold 2-2 is approximately formed in an "inverted-s" shape because the hydrogen return passage portion 3-2 and the air discharge passage portion 5-1 are symmetrical with respect to the cooling water return passage portion 7-2 therebetween.

Specifically, the flow field 8 includes a hydrogen channel 8-1 forming a hydrogen flow for a hydrogen electrode, an air channel 8-2 forming an air flow for the air electrode, and a cooling water channel 8-3 forming a cooling water flow. Therefore, the flow field 8 supplies fuel and discharges water generated by the reaction. In this case, the hydrogen channel 8-1, the air channel 8-2, and the cooling water channel 8-3 are simply represented by a single line, but are actually formed in multiple and complex lines.

Specifically, the gasket flange 9 surrounds the left manifold 2-1, the flow field 8, and the right manifold 2-2 to form an edge of the fuel cell separator 10, and provides a space in which the gasket is placed to provide airtightness when the fuel cell separator 10 forms a unit cell along with the membrane-electrode assembly and the gas diffusion layer.

Figure 2:
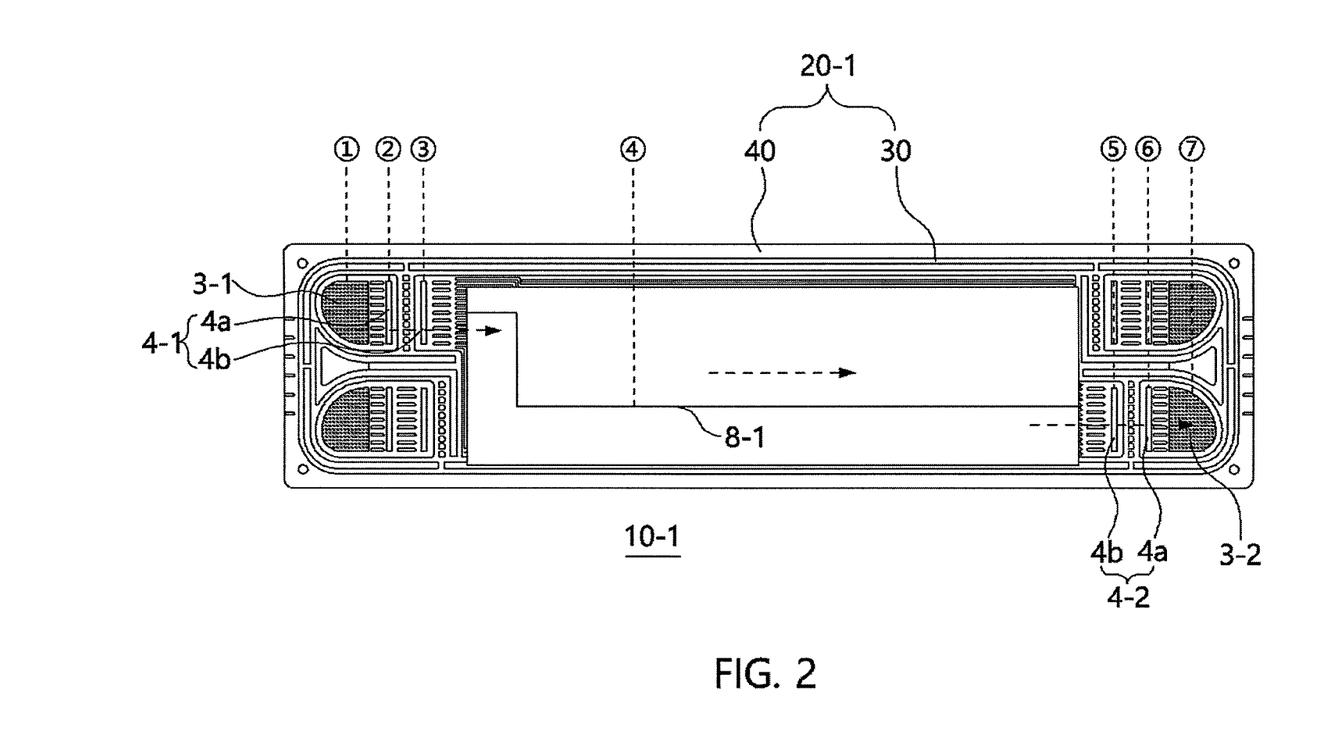
FIG. 2 illustrates a hydrogen flow state of a common flow field type fuel cell separator according to a first embodiment of this disclosure.
Figure 3:
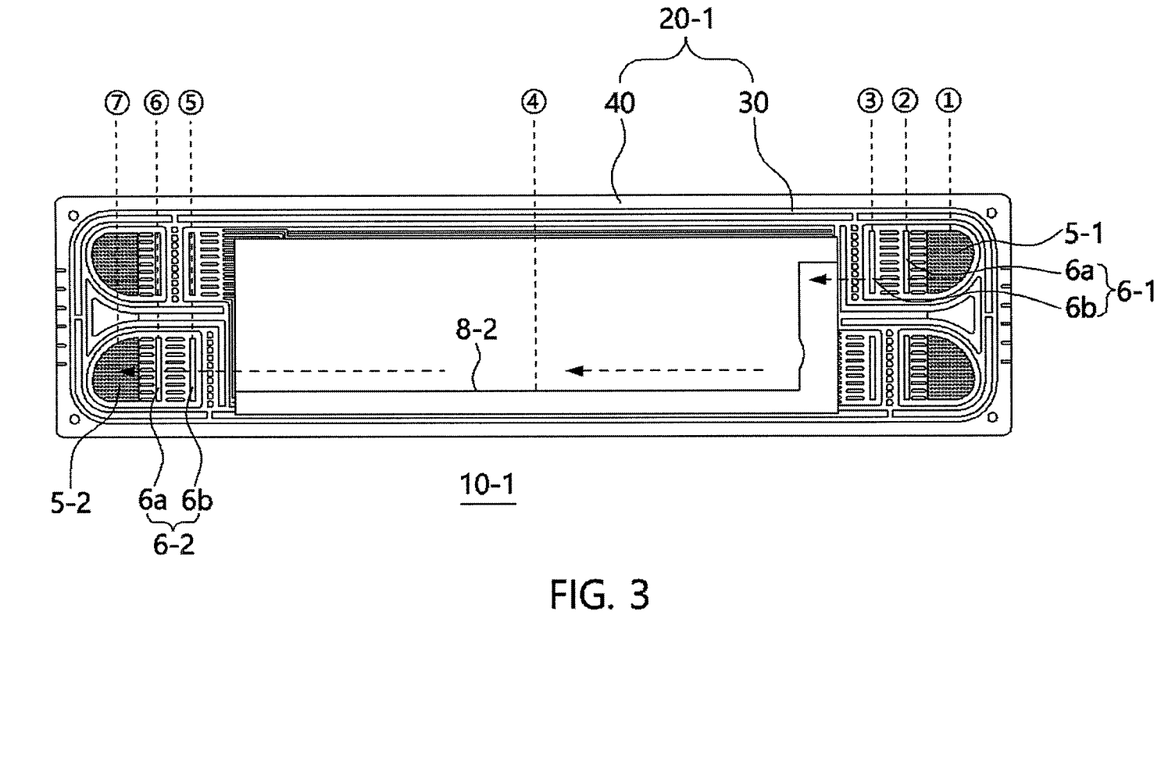
FIG. 3 illustrates an air flow state of a common flow field type fuel cell separator according to a first embodiment of the disclosure.
Figure 4:
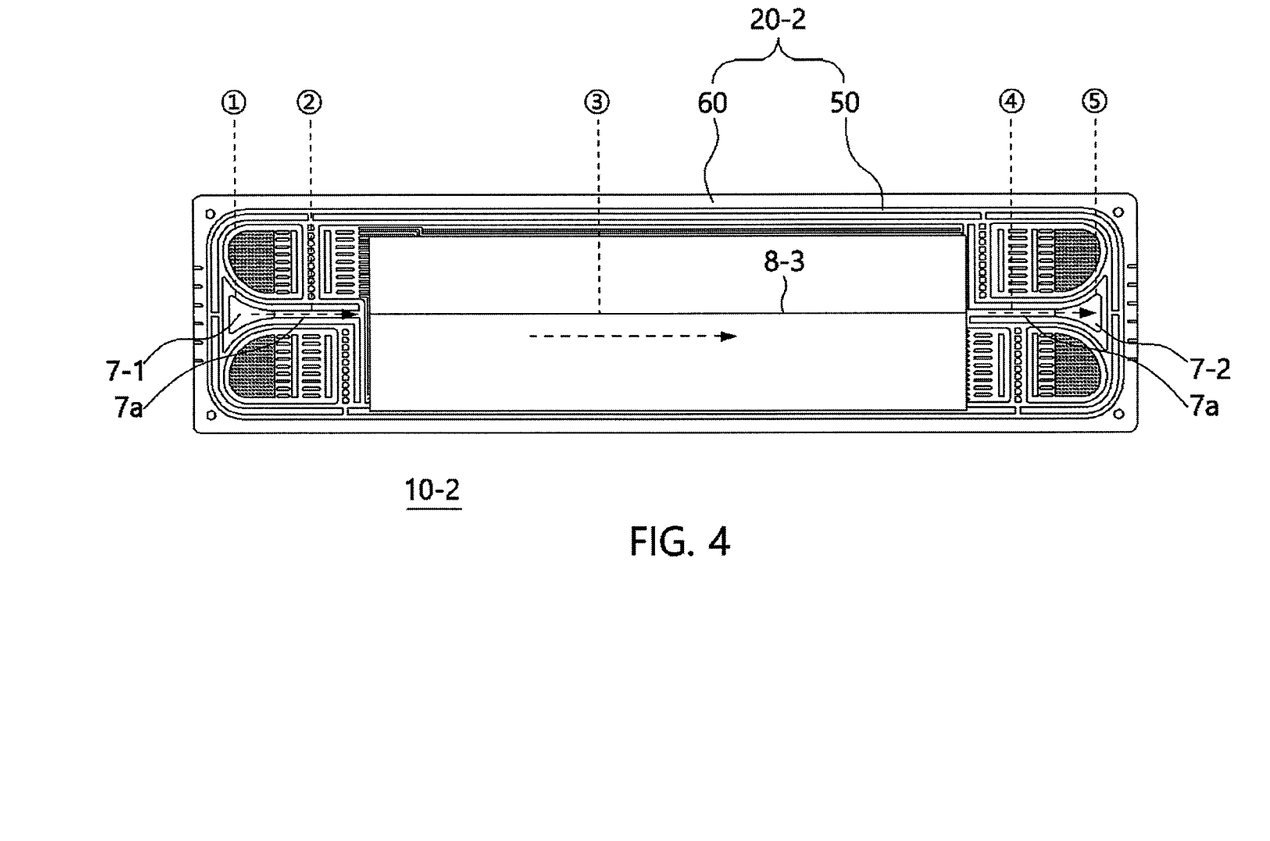
FIG. 4 illustrates a cooling water flow state of a common flow field type fuel cell separator according to a first embodiment of the present disclosure.

Meanwhile, FIGS. 2 to 4 illustrate flow states of hydrogen, air, and cooling water in the fuel cell separator 10, respectively. In this case, both sides of the fuel cell separator 10 are divided into a top surface (exposed portion) and a back surface (non-exposed portion). The symbols ①, ②, ③, ④, ⑤, ⑥, and ⑦ represent a flow sequence.

Referring to FIG. 2, the hydrogen channel 8-1 is configured such that the hydrogen discharge passage portion 3-1 and the hydrogen discharge route portion 4-1 of the left manifold 2-1 are connected to the hydrogen return route portion 4-2 and the hydrogen return passage portion 3-2 of the right manifold 2-2 to allow the hydrogen to flow from the left manifold 2-1 to the right manifold 2-2 and thus be supplied as fuel. For example, the hydrogen flows out upward from the hydrogen discharge passage portion 3-1; flows in downward through the front slit 4*a*, flows out upward through the rear slit 4*b* in the hydrogen discharge route portion 4-1, and escapes from the left manifold 2-1; flows into the right manifold 2-2 through the hydrogen channel 8-1; flows in downward through the rear slit 4*b* and flows out upward through the front slit 4*a* in the right manifold 2-2; and then flows in downward through the hydrogen return passage portion 3-2, thereby forming a fuel flow path.

Referring to FIG. 3, the air channel 8-2 is configured such that the air discharge passage portion 5-1 and the air discharge route portion 6-1 of the right manifold 2-2 are connected to the air return route portion 6-2 and the air return passage portion 5-2 of the left manifold 2-1 to allow the air to flow from the right manifold 2-2 to the left manifold 2-1 and thus to be supplied as fuel. For example, the air flows out upward from the air discharge passage portion 5-1; flows in downward through the front slit 6*a*, flows out upward through the rear slit 6*b* in the air discharge route portion 6-1, and escapes from the right manifold 2-2; flows into the left manifold 2-1 through the air channel 8-2; flows in downward through the rear slit 6*b* and flows out upward through the front slit 6*a* in the left manifold 2-1; and then flows in downward through the air return passage portion 5-2, thereby forming a fuel flow path.

Referring to FIG. 4, the cooling water channel 8-3 is provided such that the cooling water discharge passage portion 7-1 and the cooling water route portion 7*a* of the left manifold 2-1 are connected to the cooling water route portion 7*a* and the cooling water return passage portion 7-2 of the right manifold 2-2 to allow the water generated via the reaction to flow from the left manifold 2-1 to the right manifold 2-2 as cooling water and discharged to the outside after serving as cooling water. For example, the cooling water flows out upward from the cooling water discharge passage portion 7-1; escapes from the left manifold 2-1 along the cooling water route portion 7*a*; flows into the right manifold 2-2 through the cooling water channel 8-3; flows into the cooling water return passage portion 7-2 along the cooling water route portion 7*a* in the right manifold 2-2; and then flows in downward from the cooling water return passage portion 7-2, thereby forming a flow path to discharge to the outside.

Thus, the hydrogen flows from the left manifold 2-1 to the right manifold 2-2, the air flows from the right manifold 2-2 to the left manifold 2-1, and the cooling water flows from the left manifold 2-1 to the right manifold 2-2.

Figure 5:
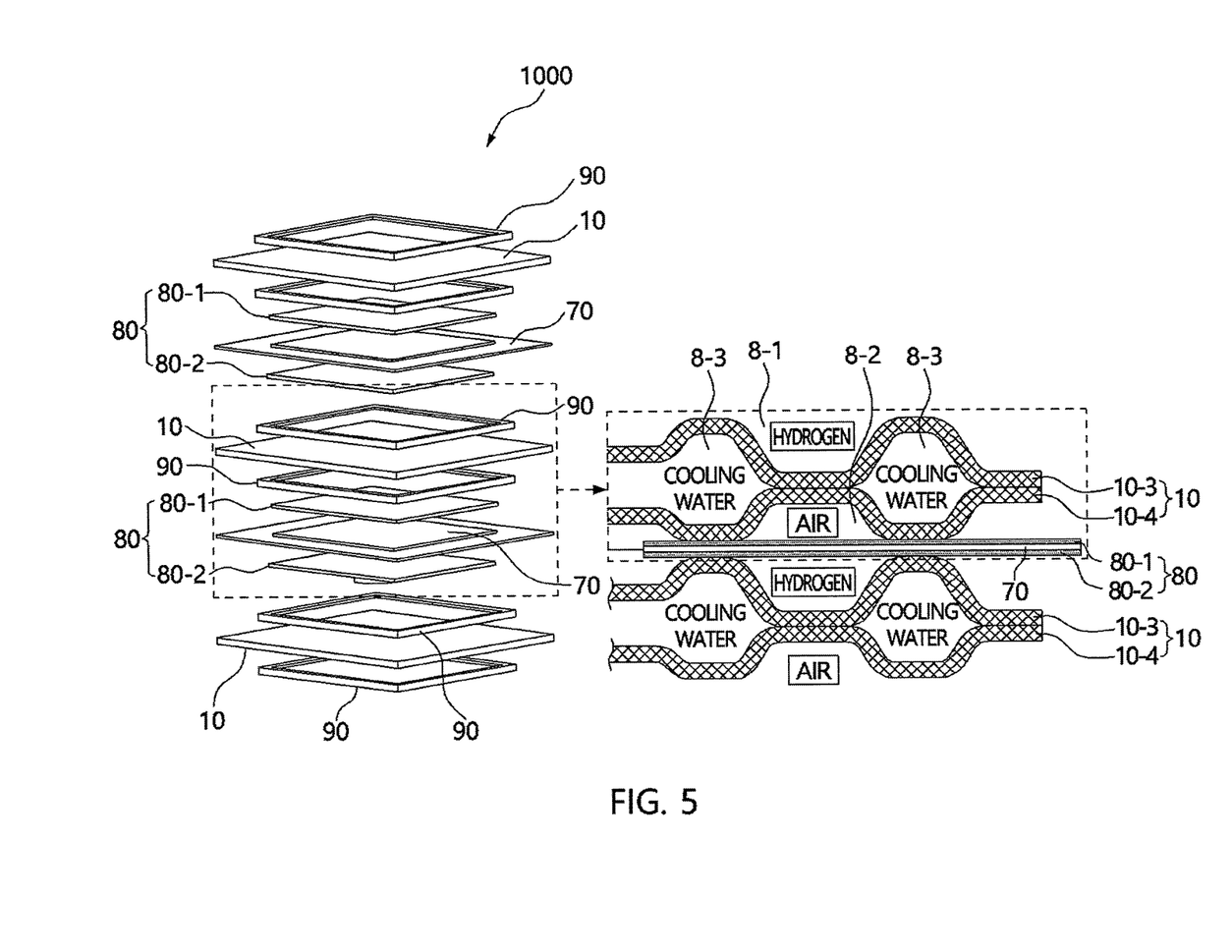
FIG. 5 illustrates a configuration diagram of a fuel cell stack to which a common flow field type fuel cell separator is applied according to a first embodiment of this disclosure.

Referring to FIG. 5, a fuel cell stack 100 includes a fuel cell separator 10, a membrane-electrode assembly 70, a gas diffusion layer 80, a gasket 90, and a gasket 90 as one unit cell, in which several tens to hundreds of unit cells are stacked so that the fuel cell stack 100 may secure an output of a desired scale. Herein, the fuel cell separator 10 is the same as the fuel cell separator 10 described with reference to FIGS. 1 to 4.

Specifically, the unit cell includes one membrane-electrode assembly 70, two gas diffusion layers 80, and two fuel cell separators 10. Herein, the fuel cell separator 10 is divided into upper and lower fuel cell separators 10-3 and 10-4 and stacked outside the gas diffusion layer 80. The membrane-electrode assembly 70 is located at the very center portion of the fuel cell stack 100 and has a catalyst layer coated on both sides of the polymer electrolyte membrane. The gas diffusion layer 80 is divided into upper and lower gas diffusion layers 80-1 and 80-2 and located outside the membrane-electrode assembly 70. The gasket 90 is located on the gasket flange 9 of the upper and lower fuel cell separators 10-3 and 10-4 and compressed and deformed to maintain airtightness. The gasket 90 is positioned between the upper fuel cell separator 10-3 and the lower gas diffusion layer 80-2 and is compressed and deformed to maintain airtightness.

As described above, the fuel cell separator is applied to the fuel cell stack according to the embodiment, in which the fuel cell separator 10 is provided with the flow field 8 located between the left manifold 2-1 and the right manifold 2-2 having an inlet and an outlet for each of hydrogen, air and cooling water and configured such that a flow of the hydrogen from the left manifold 2-1 to the right manifold 2-2, a flow of the air from the right manifold 2-2 to the left manifold 2-1 and a flow of the cooling water from the left manifold 2-1 to the right manifold 2-2 are free from interfering with each other, whereby only one set of molds having the same shape is used to accomplish ease of design and reduction in cost.

Figure 6:
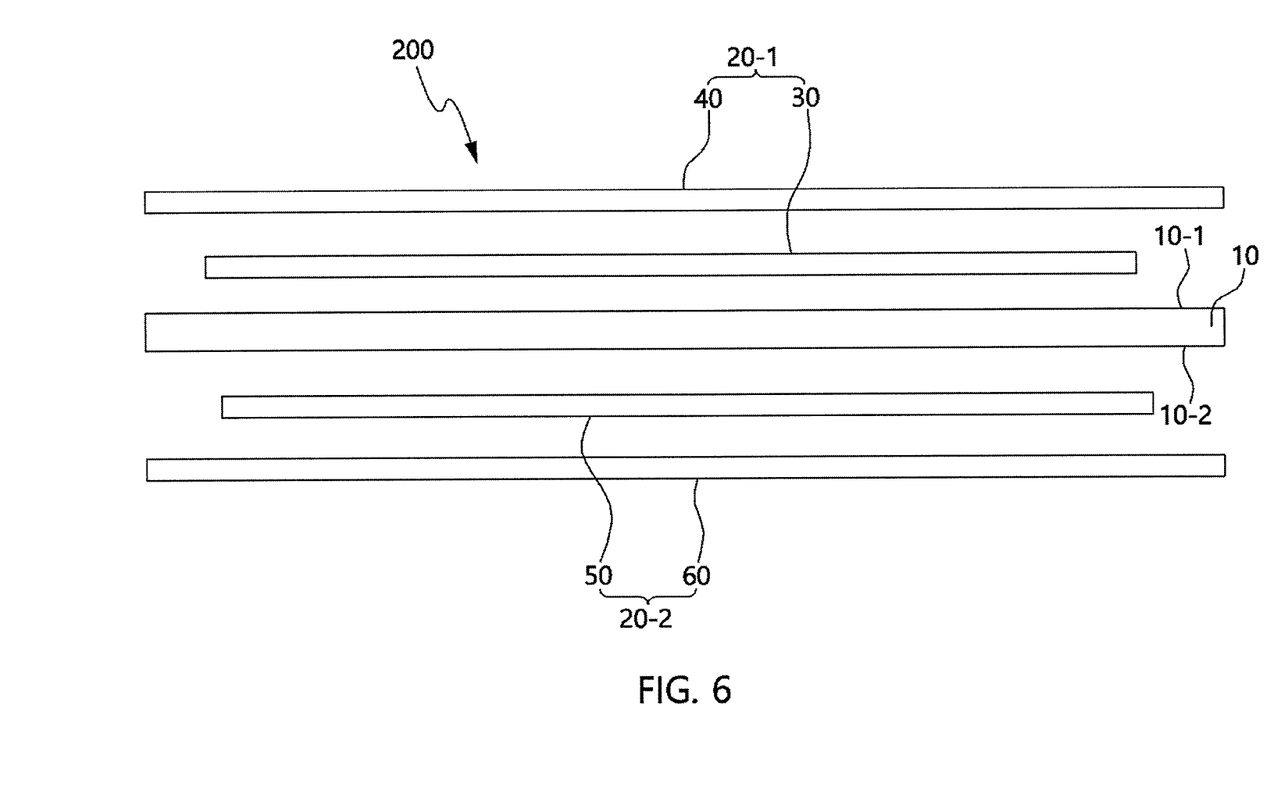
FIG. 6 illustrates a configuration diagram of a double gasket type fuel cell separator assembly according to a second embodiment of the disclosure.

Referring to FIG. 6, the fuel cell separator assembly 200 includes fuel cell separators 10, a reaction surface gasket 20-1, and a cooling surface gasket 20-2.

More specifically, the fuel cell separator 10 has one surface of upper and lower surfaces as a reaction surface 10-1 and the other surface as a cooling surface 10-2, and the reaction surface gasket 20-1 includes main gasket and sub-gasket and is positioned toward the reaction surface 10-1, and the cooling surface gasket 20-2 includes main gasket and sub-gasket and is positioned toward the cooling surface 10-2. Particularly, the sub-gasket has a larger size than that of the main gasket, and is made of rubber or silicon.

As an example, in the reaction surface gasket 20-1, the main gasket is referred to as a reaction surface main gasket 30 and the sub-gasket is referred to as a reaction surface sub-gasket 40, and in the cooling surface gasket 20-2, the main gasket is referred to as a cooling surface main gasket 50 and the sub-gasket is referred to as a cooling surface sub-gasket 60. Herein, each of the reaction surface main gasket 30, the reaction surface sub-gasket 40, the cooling surface main gasket 50, and the cooling surface sub-gasket 60 is made of rubber or silicon material and serves as a sealing material.

Figure 7:
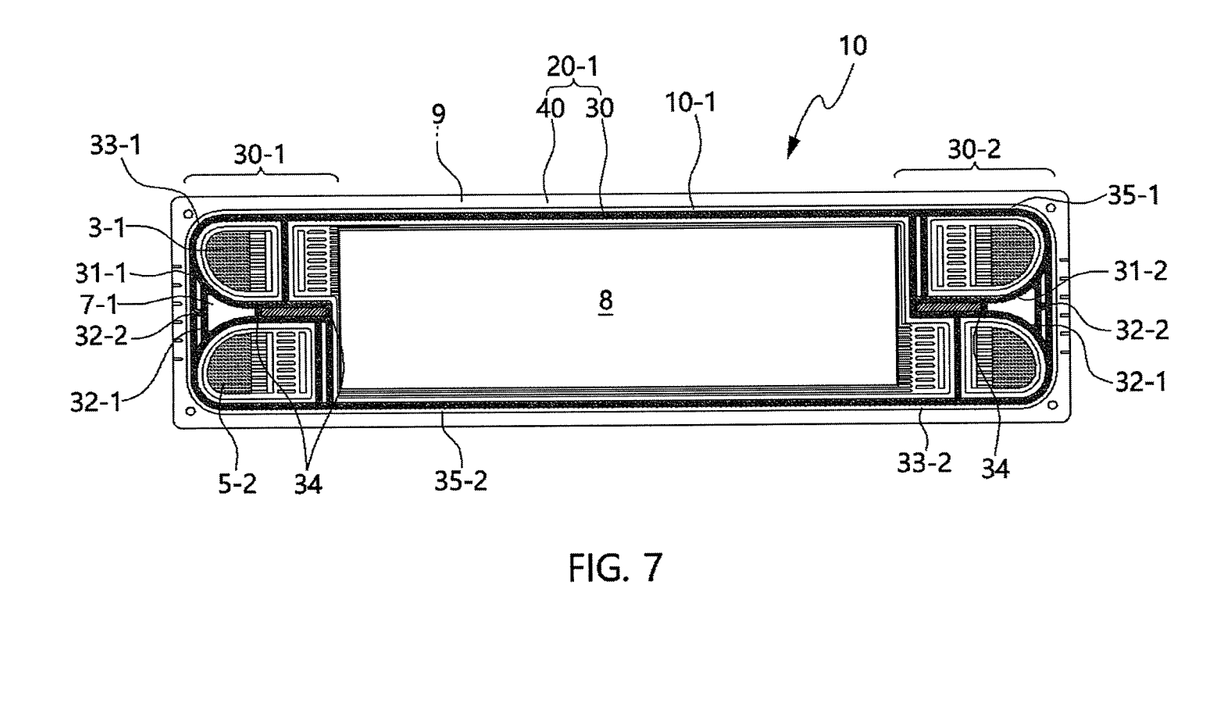
FIG. 7 illustrates a configuration diagram of a gasket in the side of a reaction surface of a fuel cell separator according to a second embodiment of the present disclosure.

Referring to the reaction surface gasket 20-1 of FIG. 7, the reaction surface sub-gasket 40 is placed in the gasket flange 9 on the side of the reaction surface 10-1 and sized to surround the outer edge of the fuel cell separator 10, whereas the reaction surface main gasket 30 is sized to be surrounded by the reaction surface sub-gasket 40 inside the reaction surface sub-gasket 40.

Therefore, the reaction surface sub-gasket 40 is the same as the entire shape of the fuel cell separator 10, and sized to surround the width of the gasket flange 9. Meanwhile, the reaction surface main gasket 30 has a shape and size corresponding to the left manifold 2-1, the flow field 8, and the right manifold 2-2. In this case, the reaction surface sub-gasket 40 and the reaction surface main gasket 30 are configured such that thicknesses thereof are given so as to maintain the elastic force while sizes thereof are limited to prevent from deforming toward the left and right manifolds 2-1 and 2-2 and the flow field 8 even under compressive deformation when unit cells are stacked.

For example, the reaction surface main gasket 30 includes an edge line 31-1 forming a loop, a left manifold line 30-1 formed on one side inside the edge line 31-1 and a right manifold line 30-2 formed on the other side inside the edge line 31-1. Therefore, the reaction surface main gasket 30 has a single loop shape.

The edge line 31-1 is provided such that the left manifold 2-1, the flow field 8, and the right manifold 2-2 are surrounded a predetermined width, and the left manifold line 30-1 is formed in the left manifold 2-1 and the right manifold line 30-2 is formed in the right manifold 2-2. In addition, the edge line 31-1 further includes an inner connection line 32-1 formed at each of the left and right manifold lines 30-1 and 30-2, in which the inner connection line 32-1 is formed in a "T" shape to allow each of the left manifold line 30-1 and the right manifold line 30-2 to be connected with the edge line 31-1.

The left manifold line 30-1 surrounds the left manifold 2-1 by a prescribed width, and is divided into a hydrogen discharge passage portion line 33-1, an air return passage portion line 35-2, and a manifold connection line 34 to allow the outer edges of the hydrogen discharge passage portion 3-1, the air return passage portion 5-2, and the cooling water discharge passage portion 7-1 to be surrounded. Particularly, the hydrogen discharge passage portion line 33-1 is connected to the edge line 31-1 in the middle portion of the hydrogen discharge route portion 4-1 connected to the hydrogen discharge passage portion 3-1, and the manifold connection line 34 connects the hydrogen discharge passage portion line 33-1 with the edge line 31-1. Meanwhile, the air return passage portion line 35-2 surrounds the air return route portion 6-2 connected to the air return passage portion 5-2 to be connected to the edge line 31-1. In addition, the hydrogen discharge passage portion line 33-1 and the air return passage portion line 35-2 forms another connection portion between the inner connection line 32-1 and the manifold connection line 34.

The right manifold line 30-2 surrounds the right manifold 2-2 by a prescribed width, and is divided into the hydrogen return passage portion line 33-2, the air discharge passage portion line 35-1, and the manifold connection line 34 to surround the outer edges of the hydrogen return passage portion 3-2, the air discharge passage portion 5-1, and the cooling water return passage portion 7-2. Particularly, the hydrogen return passage portion line 33-2 is connected to the edge line 31-1 in the middle portion of the hydrogen return route portion 4-2 connected to the hydrogen return passage portion 3-2, and the manifold connection line 34 connects the hydrogen return passage portion line 33-2 with the edge line 31-1. Meanwhile, the air discharge passage portion line 35-1 surrounds the air discharge route portion 6-1 connected to the air discharge passage portion 5-1 to be connected to the edge line 31-1. In addition, the hydrogen return passage portion line 33-2 and the air discharge passage portion line 35-1 forms another connection portion between the inner connection line 32-1 and the manifold connection line 34.

Subsequently, the hydrogen discharge passage portion line 33-1 and the air return passage portion line 35-2 of the left manifold line 30-1, and the hydrogen return passage portion line 33-2 and the air discharge passage portion line 35-1 of the right manifold line 30-2 have the same shape, and herein the manifold connection line 34 is connected to the edge line 31-1 while covering the outer edge of the cooling water discharge passage portion 7-1 and the cooling water return passage portion 7-2.

Figure 8:
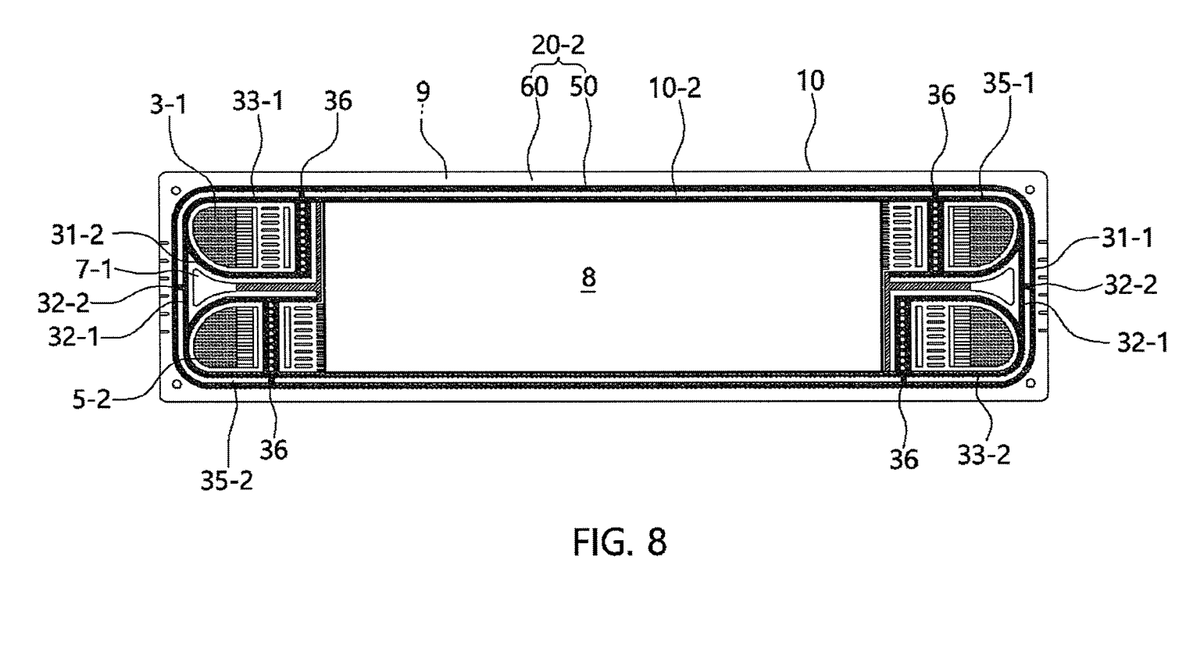
FIG. 8 illustrates a configuration diagram of a gasket in the side of a cooling surface of the fuel cell separator according to a second embodiment of this disclosure.

Referring to the cooling surface gasket 20-2 of FIG. 8, the cooling surface sub-gasket 60 is placed on the gasket flange 9 in the cooling surface 10-2 and sized to surround the outer edge of the fuel cell separator 10, whereas the cooling surface main gasket 50 is sized to be surrounded by the cooling surface sub-gasket 60 inside the cooling surface sub-gasket 60. In this case, the cooling surface sub-gasket 60 and the cooling surface main gasket 50 are configured such that thicknesses thereof are given so as to maintain the elastic force while sizes thereof are limited to prevent from deforming toward the left and right manifolds 2-1 and 2-2 and the flow field 8 even under compressive deformation when unit cells are stacked.

Therefore, the cooling surface sub-gasket 60 is the same as an entire shape of the fuel cell separator 10, and sized to surround a width of the gasket flange 9. Meanwhile, the cooling surface main gasket 50 has a shape and size corresponding to the right manifold 2-2, the flow field 8, and the left manifold 2-1. In this case, the cooling surface sub-gasket 60 and the cooling surface main gasket 50 are configured such that thicknesses thereof are given so as to maintain the elastic force while sizes thereof are limited to prevent from deforming toward the left and right manifolds 2-1 and 2-2 and the flow field 8 even under compressive deformation when unit cells are stacked.

As an example, the cooling surface main gasket 50 includes the edge line 31-1 forming a loop, the left manifold line 30-1 formed on one side inside the edge line 31-1, the right manifold line 30-2 formed on the other side inside the edge line 31-1, and the sub-edge line 31-2 forming a closed section by surrounding the edge line 31-1 outside the edge line 31-1. Therefore, the cooling surface main gasket 50 is formed in a double loop shape having an inside loop of the edge line 31-1 and an outside loop of the sub-edge line 31-2.

The edge line 31-1 is provided such that the right manifold 2-2, the flow field 8, and the left manifold 2-1 are surrounded a predetermined width, and the right manifold line 2-1 is formed in the side of right manifold line 30-2, and the left manifold line 30-1 is formed in the side of the left manifold 2-1. Meanwhile, the sub-edge line 31-2 further forms an outer connection line 32-2 connected to the edge line 31-1, in which the outer connection line 32-2 is formed in a "-" shape to allow the edge line 31-1 to be connected to the sub-edge line 31-2 in the left manifold line 30-1 and the right manifold line 30-2.

The left manifold line 30-1 surrounds the left manifold 2-1 by a predetermined width, and is divided into the hydrogen discharge passage portion line 33-1, the air return passage portion line 35-2, and an edge connection line 36 to form the outer edges of the hydrogen discharge passage portion 3-1, the air return passage portion 5-2, and the cooling water discharge passage portion 7-1. Particularly, the hydrogen discharge passage portion line 33-1 surrounds the hydrogen discharge route portion 4-1 leading to the hydrogen discharge passage portion 3-1 to be connected to the edge line 31-1, and the edge connection line 36 located a distance from the hydrogen discharge route portion 4-1 is further formed to be connected to the edge line 31-1 in a double manner. Meanwhile, the air return passage portion line 35-2 is connected to the edge line 31-1 at a middle portion of the air return route portion 6-2 connected to the air return passage portion 5-2. Therefore, the hydrogen discharge passage portion line 33-1 and the air return passage portion line 35-2 do not surround the outer edge of the cooling water discharge passage portion 7-1.

The right manifold line 30-2 surrounds the right manifold 2-2 by a prescribed width, and is divided into the hydrogen return passage portion line 33-2, the air discharge passage portion line 35-1, the edge connection line 36 to form the outer edge of the hydrogen return passage portion 3-2, the air discharge passage portion 5-1, and the cooling water return passage portion 7-2. Particularly, the hydrogen return passage portion line 33-2 surrounds the hydrogen return route portion 4-2 connected to the hydrogen return passage portion 3-2 to be connected to the edge line 31-1, and an edge connection line 36 located a distance from the hydrogen return route portion 4-2 is further formed to be connected to the edge line 31-1 in a double manner. Meanwhile, the air discharge passage portion line 35-1 is connected to the edge line 31-1 at a middle portion of the air discharge route portion 6-1 connected to the air discharge passage portion 5-1. Therefore, the hydrogen return passage portion line 33-2 and the air discharge passage portion line 35-1 do not surround the outer edge of the cooling water return passage portion 7-2.

Subsequently, the hydrogen discharge passage portion line 33-1 and the air return passage portion line 35-2 of the left manifold line 30-1 and the hydrogen return passage portion line 33-2 and the air discharge passage portion line 35-1 of the right manifold line 30-2 are formed in the same shape, in which the edge connection line 36 is connected to the edge line 31-1 while not covering the outer edges of the cooling water discharge passage portion 7-1 and the cooling water return passage portion 7-2.

Figure 9:
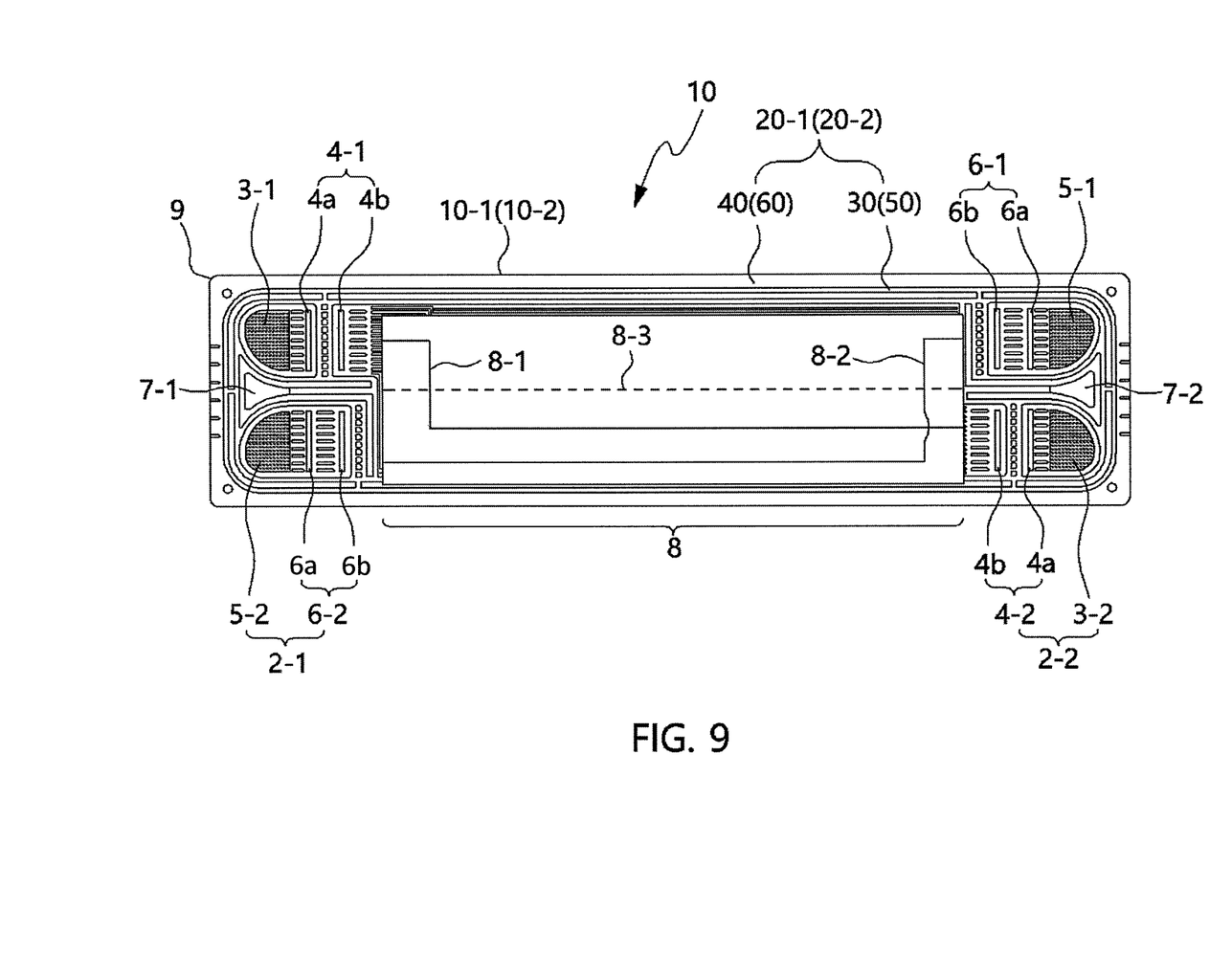
FIG. 9 illustrates a configuration diagram of a fuel cell separator according to a second embodiment of the disclosure.

Meanwhile, referring to FIG. 9, the fuel cell separator 10 comprises flow field 8 located between the left manifold 2-1 and the right manifold 2-2 to connect the left manifolds 2-1 with the right manifolds 2-2, the reaction surface gasket 20-1 providing airtightness when the fuel cell separator 10 forms a unit cell along with a membrane-electrode assembly and a gas diffusion layer by surrounding the left manifold 2-1, the flow field 8, and the right manifold 2-2 to form the edge of the fuel cell separator 10, and a gasket flange 9 providing a space in which the cooling surface gasket 20-2 is placed. Therefore, the left and right manifolds 2-1 and 2-2, the flow field 8, and the gasket flange 9 are formed in the same shape as that of each of the reaction surface 10-1 and the cooling surface 10-2.

Specifically, the left manifold 2-1 includes the hydrogen discharge passage portion 3-1, the hydrogen discharge route portion 4-1, the air return passage portion 5-2, the air return route portion 6-2, and the cooling water discharge passage portion 7-1. Herein, "discharge" means an outlet to discharge, and the "return" means an inlet to enter again.

As an example, the hydrogen discharge passage portion 3-1 and the hydrogen discharge route portion 4-1 are formed by making a hole in the surface of the body of the left manifold 2-1, and the hydrogen discharge passage portion 3-1 and the hydrogen discharge route portion 4-1 are consecutively disposed in a straight line in terms of layout so that the hydrogen discharge route portion 4-1 located a distance from the hydrogen discharge passage portion 3-1 is located closely to the flow field 8. The air return passage portion 5-2 and the air return route portion 6-2 are formed by making a hole in the surface of the body of the left manifold 2-1 and the air return passage portion 5-2 and the air return route portion 6-2 are consecutively disposed in a straight line in terms of layout so that the air return route portion 6-2 located a distance from the air return passage portion 5-2 is located closely to the flow field 8. The cooling water discharge passage portion 7-1 separates the hydrogen discharge passage portion 3-1 from the air return passage portion 5-2, and is formed by making a hole in the surface of the body of the left manifold 2-1 to be connected to the flow field 8. Therefore, the left manifold 2-1 is provided such that the hydrogen discharge passage portion 3-1 and the air return passage portion 5-2 are symmetrical with respect to the cooling water discharge passage portion 7-1 therebetween.

Specifically, the right manifold 2-2 includes the hydrogen return passage portion 3-2, the hydrogen return route portion 4-2, the air discharge passage portion 5-1, the air discharge route portion 6-1, and the cooling water return passage portion 7-2. Herein, "discharge" means an outlet to escape, and "return" means an inlet to enter again.

As an example, the hydrogen return passage portion 3-2 and the hydrogen return route portion 4-2 are formed by making a hole in the surface of the body of the right manifold 2-2, and the hydrogen return passage portion 3-2 and the hydrogen return route portion 4-2 are consecutively disposed in a straight line in terms of layout so that the hydrogen return route portion 4-2 located a distance from the hydrogen return passage portion 3-2 is located closely to the flow field 8. The air discharge passage portion 5-1 and the air discharge route portion 6-1 are formed by making a hole in the surface of the body of the right manifold 2-2, and the air discharge passage portion 5-1 and the air discharge route portion 6-1 are consecutively disposed in a straight line in terms of layout so that the air discharge route portion 6-1 located a distance from the air discharge passage portion 5-1 is located closely to the flow field 8. The cooling water return passage portion 7-2 separates the hydrogen return passage portion 3-2 from the air discharge passage portion 5-1, and is formed by making a hole in the surface of the body of the right manifold 2-2 to be connected to the flow field 8. Therefore, the right manifold 2-2 is provided such that the hydrogen return passage portion 3-2 and the air discharge passage portion 5-1 are symmetrical with respect to the cooling water return passage portion 7-2 therebetween.

Specifically, the flow field 8 is divided into a hydrogen channel 8-1 forming the hydrogen flow of the hydrogen electrode, an air channel 8-2 forming the air flow of the air electrode, and a cooling water channel 8-3 forming the cooling water flow. Therefore, the flow field supplies the fuel and discharges water generated by the reaction. In this case, the hydrogen channel 8-1, the air channel 8-2, and the cooling water channel 8-3 are simply represented by a single line, but actually formed in multiple and complex lines.

Specifically, the gasket flange 9 forms the edge of the fuel cell separator 10 by surrounding the left manifold 2-1, the flow field 8, and the right manifold 2-2, and provides a space in which the reaction surface gasket 20-1 and the cooling surface gasket 20-2 are placed to provide airtightness when forming a unit cell with the fuel cell separator 10 together with a membrane-electrode assembly and a gas diffusion layer.

As described above, the fuel cell separator assembly 200 according to the present embodiment includes the fuel cell separator 10 forming flow paths of hydrogen, air, and cooling water, the reaction surface gasket 20-1 that comprises the reaction surface main gasket 30 enabling maintaining of airtightness with respect to the flow path in the reaction surface 10-1 of the fuel cell separator 10 and the reaction surface sub-gasket 40 enabling maintaining of airtightness with respect to the reaction surface 10-1 by surrounding the reaction surface main gasket 30, and the cooling surface gasket 20-2 that comprises the cooling surface main gasket 50 enabling maintaining airtightness with respect to the flow path in the cooling surface 10-2 of the fuel cell separator 10 and the cooling surface sub-gasket 60 enabling maintaining of airtightness with respect to the cooling surface 10-2 by surrounding the cooling surface main gasket 50, whereby a double gasket of main and sub prevents the flow field from being reduced due to compressive deformation and also prevents a pressure loss in the flow field due to complexity of the flow channel when stacking unit cells.

What is claimed is:

1. A fuel cell separator assembly, the fuel cell separator assembly comprising:
    a sub-gasket surrounding a periphery of flow paths of hydrogen, air, and cooling water formed in a fuel cell separator to allow a sealing portion to be formed; and
    a main gasket, in order to cause the flow paths to be divided into a hydrogen flow path, an air flow path, and a cooling water flow path, the main gasket surrounding each of the hydrogen flow path, the air flow path, and the cooling water flow path to allow a boundary to be formed,
    wherein the main gasket is provided such that the boundary of the flow paths is formed using a left manifold line and a right manifold line formed in opposite sides with respect to a center section and a boundary line is formed using the left manifold line formed on one side inside an edge line, the right manifold line formed on the other side inside the edge line, and a sub edge line forming a closed section by surrounding the edge line outside the edge line, and
    wherein the main gasket further includes an inner connection line of the edge line, in which the inner connection line is formed in a "T" shape to allow each of the left manifold line and the right manifold line to be connected with the edge line, or an outer connection line connected to the edge line, in which the outer connection line is formed in a "-" shape to allow the edge line to be connected to the sub edge line in the left manifold line and the right manifold line.

2. The fuel cell separator assembly as set forth in claim 1, wherein the sub-gasket extends around the edge of the fuel cell separator to surround the main gasket.

3. The fuel cell separator assembly as set forth in claim 2, wherein the sub-gasket has a width same as that of the edge of the fuel cell separator.

4. A fuel-cell separator assembly, the fuel-cell separator assembly comprising:
    a sub-gasket surrounding a periphery of flow paths of hydrogen, air, and cooling water formed in a fuel cell separator to seal the periphery; and
    a main gasket, positioned inside the sub-gasket, the main gasket configured to divide the flow paths into a hydrogen flow path, an air flow path, and a cooling water flow path, the main gasket comprising:
        a sub-edge line collectively surrounding the hydrogen flow path, the air flow path, and the cooling water flow path;
        an inner edge line, positioned inside the sub-edge line, the inner edge line collectively surrounding the hydrogen flow path, the air flow path, and the cooling water flow path; and
        an outer connection line connecting the sub-edge line with the inner edge line.

5. The fuel-cell separator assembly of claim 4, wherein the main gasket further comprises: a left manifold line and a right manifold line; each of the left manifold line and the right manifold line configured to individually surround at least a portion of each of the hydrogen flow path and the air flow path.

* * * * *

UNITED STATES PATENT AND TRADEMARK OFFICE
CERTIFICATE OF CORRECTION

Page 1 of 1

PATENT NO. : 10,971,739 B2
APPLICATION NO. : 15/934676
DATED : April 6, 2021
INVENTOR(S) : Hyung-Chul Noh et al.

It is certified that error appears in the above-identified patent and that said Letters Patent is hereby corrected as shown below:

In the Specification
Column 8, Line 44, change ""s"" to --"ε"--
Column 9, Line 29, change "-s"" to -- -ε"--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*